United States Patent [19]

Nola

[11] Patent Number: 4,489,243
[45] Date of Patent: Dec. 18, 1984

[54] SOLAR POWERED ACTUATOR WITH CONTINUOUSLY VARIABLE AUXILIARY POWER CONTROL

[75] Inventor: Frank J. Nola, Huntsville, Ala.

[73] Assignee: The United States of America as represented by the Administrator of the National Aeronautics and Space Administration, Washington, D.C.

[21] Appl. No.: 375,684

[22] Filed: May 6, 1982

[51] Int. Cl.³ .............................................. H02P 7/80
[52] U.S. Cl. ........................................ 307/64; 307/66; 318/46; 318/729; 290/1 R; 290/4 R
[58] Field of Search .................. 318/729, 46, 106, 51; 307/64–67, 85; 290/1 R, 4 B; 136/248

[56] References Cited

U.S. PATENT DOCUMENTS 4,333,136 6/1982 Baker ..................................... 363/43

Primary Examiner—David Smith, Jr.
Attorney, Agent, or Firm—Joseph H. Beumer; John R. Manning; Leon D. Wofford, Jr.

[57] ABSTRACT

A solar powered system wherein a load such as a compressor (16) is driven by a main induction motor (14) powered by a solar array (10), and an auxiliary motor (18) shares the load with the solar powered motor in proportion to the amount of sunlight available, is provided with a power factor controller (20) for controlling voltage applied to the auxiliary motor in accordance with the loading on that motor. In one embodiment, when sufficient power is available from the solar cell array the auxiliary motor is driven as a generator by excess power from the main motor so as to return electrical energy to the power company utility lines.

2 Claims, 1 Drawing Figure

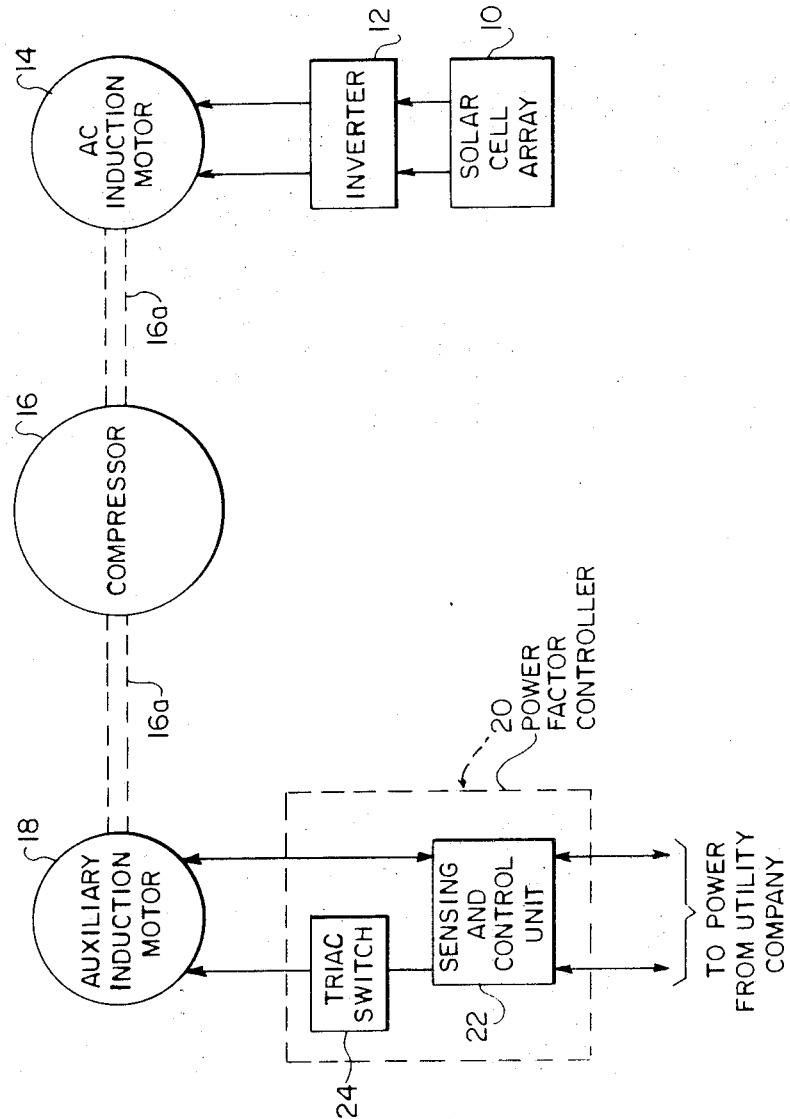

SOLAR POWERED ACTUATOR WITH CONTINUOUSLY VARIABLE AUXILIARY POWER CONTROL

ORIGIN OF THE INVENTION

The invention described herein was made by an employee of the United States Government and may be manufactured and used by or for the Government for Government purposes with the payment of any royalties thereon or therefor.

TECHNICAL FIELD

The present invention relates to solar powered rotary drive systems for heat pumps, air conditioners and the like and, more particularly, to improved systems of this type which provide substantial energy savings.

BACKGROUND ART

The current energy "crisis" or shortage has created a need for alternative sources of energy. One such source of energy that shows promise is the solar powered rotary actuator which, for example, may comprise a heat pump or air conditioner powered by the sun. In an exemplary system, power from photo-voltaic cells would be conditioned by a conventional inverter to drive an a.c. induction motor which, in turn, would drive the heat pump compressor. In another embodiment, steam generated from a solar collector system would drive a turbine which, in turn, would drive the compressor. In the more elaborate and expensive systems, excess energy is collected and stored by batteries or other storage devices to be used during those times when the amount of sunlight is insufficient to carry the load. In addition, a conventional a.c. induction motor, driven by power from the local utility, is required to drive the compressor during such periods of insufficient sun. In the past, a detector has been used to determine when the power produced by the sun is insufficient and to switch the utility driven motor into the system to drive the compressor. It will be appreciated that during a partly cloudy day, the auxiliary motor, under the control of the detector, would continually be switched on and off as the sun is blocked and unblocked by the clouds. Such operation is objectionable and requires the use of an excess of solar cells and storage batteries, thereby greatly increasing the cost of installation, and maintenance, of the system.

SUMMARY OF THE INVENTION

The present invention, is concerned with improvements in systems of the type described above. In particular, a power factor controller is used to control the operation of the auxiliary motor, i.e., the motor used to drive the load (compressor) during periods of insufficient solar power, whereby the voltage applied from the utility power lines to the auxiliary motor is decreased when the motor is lightly loaded and is increased with increased loading to maintain constant speed operation. In this way the wastage of energy associated with system such as described above is eliminated.

In a first embodiment, the power factor controller is of the type described in U.S. Pat. No. 4,052,648 (Nola) wherein a thyristor (triac) switch is controlled in accordance with the phase difference between the load voltage and current. The subject matter of that patent is hereby incorporated by reference. With this arrangement, the loading of the auxiliary motor (and hence the proportion of the load carried by the solar powered drive motor) is sensed by sensing this phase difference and the voltage applied to the auxiliary motor is controlled accordingly.

In a second embodiment, a power factor controller is employed which is generally similar to that of the Nola patent referred to above but which, in addition, provides regenerative braking. Such a power factor controller is disclosed in copending U.S. application Ser. No. 350,472, filed Feb. 19, 1982 now U.S. Pat. No. 4,417,190, in the name of Frank J. Nola, and entitled "Control System For An Induction Motor With Energy Recovery". This application, the subject matter of which is hereby incorporated by reference, is a continuation-in-part of U.S. application Ser. No. 243,683, filed Mar. 16, 1981, now U.S. Pat. No. 4,388,585 and entitled "Energy Saving Phase Control for Induction Generators" and of U.S. application Ser. No. 297,524, filed Aug. 28, 1981, now U.S. Pat. No. 4,439,718 and entitled "Motor Power Control Circuit for A.C. Inductor Motor". In this embodiment, an excess of solar cells is used and an inverter and motor are employed which are larger than required to drive the load (compressor) alone. No energy storage is used and as discussed below, this is a significant savings over prior art systems. When the sun is shining, the excess energy generated and converted above that needed to drive the load is used to drive the auxiliary motor as a generator. The power factor controller of this embodiment serves to minimize the machine losses by reducing the voltage applied to the motor when only a slight excess of energy is available and to increase the applied voltage, thereby allowing more power to be returned to the line, when a large excess is available. Thus, this embodiment enables excess energy to be economically converted to supplement energy supplied by the utility to other associated systems.

Other features and advantages of the invention will be described in, or apparent from, the detailed description of a preferred embodiment which follows.

BRIEF DESCRIPTION OF THE DRAWINGS

The single FIGURE in the drawings is a schematic diagram, in block form, of a solar powered compressor system incorporating the invention.

DESCRIPTION OF THE PREFERRED EMBOIMENTS

Referring to FIG. 1, a preferred embodiment of the solar power actuator system of the invention is shown. The system includes a bank or array of photo-voltaic cells, denoted 10, which produce an electrical (d.c.) output responsive to the solar radiation falling thereon. An inverter 12 is connected to the solar cells 10 and converts the d.c. output power produced by the solar cells 10 into a.c. power which is used to drive an a.c. induction motor 14. Inductor motor 14 is connected to the drive shaft 16a of a heat pump compressor 16. It is noted that while a d.c. motor could be used in place of induction motor 14 to drive compressor 16, such d.c. motors are generally not acceptable because of the short brush life of these motors.

An auxiliary induction motor 18 is also connected to common drive shaft 16a of compressor. Considering a conventional system for a moment, and assuming that, as discussed above, the number of photocells used is only that number sufficient to supply the required power and no storage batteries are used, a detector would be used to sense the amount of sunlight and would switch an auxiliary motor (corresponding to motor 18) in and out of the system in accordance with the solar radiation being supplied. On cloudy days, this auxiliary motor would continually be switched in and out of the system and a substantial addition of solar cells and storage batteries would be required to provide proper operation, with the obvious attendant disadvantages of such additions.

As discussed hereinbefore, in accordance with the invention, a power factor controller 20 is connected to the auxiliary motor 18. Controller 20 is driven by power by the power (utility) company and is preferably of the form disclosed in U.S. Pat. No. 4,052,648 (Nola) referred to above. As mentioned previously, such a power factor controller is used in conjunction with an induction motor to sense the loading on the motor and acts to automatically increase the voltage supplied to the motor in response to increased loading so as to maintain a constant output speed. Further, this controller also acts to reduce the voltage applied when the loading on the motor is light. More specifically, the power factor controller includes a sample and control unit 22 which samples the line voltage and current associated with the motor and controls the switching of a thyristor (SCR or triac) represented by triac switch 24 and connected in series with the motor, in accordance with the phase difference between this voltage and current.

The use of a power factor controller 20 as described above eliminates the need for the detector arrangement, the on-off switching technique and the provision for excess cells and storage. In operation, when the sun is shining, the compressor 16 is driven by inverter-fed induction motor 14. Under these circumstances, the auxiliary motor 18 is unloaded and any slight overspeed sensed by the power factor controller 20 results in reducing substantially to zero the voltage applied to auxiliary induction motor 18. Motor 18, apart from windage and friction, offers no resistance to the inverter-fed motor 14. However, as the amount of energy from the sun decreases, the motor 14 will not be able to carry the load thereon, and the power factor controller 20 will sense the increased loading of motor 18. Under these circumstances, controller 20 will provide an increase in the voltage applied from the utility company to motor 18 in order to maintain constant the speed of compressor 16. Thus, controller 20 controls, on a continuous basis, the voltage applied to motor 18 from zero volts where there is sufficient sunlight to drive motor 14, to an intermediate voltage where there is partial sunlight and motor 18 must share the load with motor 14, and up to full voltage when there is no sunlight and auxiliary motor 18 carries the full load.

It is noted that to provide additional economies, the motor 18 and 14 could share a common housing or even a common magnetic core (but with isolated windings).

In a second embodiment of the invention, power factor controller 20 is of a further type which provides regenerative braking. In this embodiment, the installation includes an excess of solar cells 10, a larger inverter 12 and a larger motor 14 than that required to drive the compressor alone. No energy storage is used and it is important to note that the cost of energy storage alone could be considerably greater than the cost of the larger inverter and motor. (It will be appreciated that with a storage approach, additional cells would be required in any event). As noted above, a power factor controller of this type is disclosed in copending application Ser. No. 350,472, filed on Feb. 19, 1982, and entitled "Control System For an Induction Motor with Energy Recovery. This application discloses a control system which is adapted to enhance the recovery of power from a motor when the motor is caused to overspeed to speeds in excess of the synchronization speed of the motor. The overall system is similar to that described in U.S. Pat. No. 4,052,648 and includes an induction motor coupled to an A.C. power line through a triac, and in general terms, the control system acts to detect the power factor for the motor operation and to vary the advance of the firing angle of the triac as a direct function of the power factor and the load on the motor. More specifically, similarly to the power factor controller described above, as the load on the motor decreases the voltage applied thereto decreases and when the motor idles, a minimum voltage is applied. If the load attempts to overspeed the motor (e.g. where, as here, the load is driven by another motor), the phase lag between the load voltage and current would normally continue to increase and would ultimately result in the application of no voltage to the motor. By placing a voltage limiter in the system to prevent the phase difference related control voltage from dropping below the minimum valve which normally occurs at no load or idling of the motor, the motor-controller combination will serve as a generator when driven by the load and the controller will provide firing angle control for the triac used in controlling the input voltage to the motor. Thus considering the application of such a controller to the overall system shown in the drawings, the controller 20 will function as a power factor controller of the nature described in the Nola patent when the induction motor 18 operates as a motor and will automatically revert to operation as a fixed angle controller with "motor" 18 driven as a generator. Again, reference is made to the copending application referred to above for details of the controller of this embodiment.

Turning again to the operation of the overall system when incorporating a power factor controller of the type just discussed, by limiting the firing angle of the control triac of controller 20 to a minimum value, the induction motor 18 will be converted to a generator when overdriven and thus the mechanical energy input thereto is converted into electrical energy which is fed back through controller 20 to the utility line. This will occur when the sun is shining and therefor excess energy is generated by the larger motor 14 to drive motor 18 as a generator. Therefore, in addition to solar energy powering of heat pump 18, the controller 20 enables the excess energy to be economically converted to supplement energy supplied by the utility to other systems in the building or other installation. Because of the characteristics of the induction "generator" 18, the line regulates both frequency and voltage, thereby eliminating the need for expensive conversion equipment. It is, of course, to be understood that during periods of partial or no sunlight, the auxiliary motor 18 shares or carries the load.

It will be appreciated that the general approaches described above are also applicable to solar systems which use steam or another gas to drive a turbine which, in turn, would drive the compressor.

Although the invention has been described with respect to preferred embodiments thereof, it will be understood by those skilled in the art that variations and modifications can be effected in these exemplary embodiments without departing from the scope and spirit of the invention.

I claim:

1. In a solar energy powered system comprising an array of solar cells for receiving solar energy and for producing an electrical output in accordance therewith; a first induction motor including an output drive shaft; means for processing the electrical output of said solar cell array so as to produce an electrical drive signal for said first motor and for applying said drive signal to said first motor; a load driven from the output drive shaft of said first motor; a second, auxiliary induction motor, connected to said load and adapted to receive electrical power from an electrical utility, for, as required, carrying a proportion of the load in dependence on the amount of solar energy received by said solar cell array, the improvement wherein a power factor controller is connected to said second motor so as to control the voltage applied to said second motor in accordance with the proportion of the load carried by said second motor such that the voltage applied to said second motor is decreased with a decrease in the proportion of the load carried by said second motor, said power factor controller including a thyristor switch and means for sensing the phase difference between the load current and voltage of said second motor and for controlling switching of said thyristor switch to control the voltage applied to the second motor in accordance with the sensed phase difference between said load current and voltage, said processing means comprising an inverter for converting the output of the solar cell array into an alternating current signal, the number of solar cells being in excess of that required to drive said load, said second motor being coupled to the drive shaft of the first motor, the capacity of said first motor, with full power applied thereto from the solar cell array, being in excess of that required to drive the load, and said second motor being coupled to the load as as to be driven as a generator under the control of said power factor controller when full power is applied to the first motor, said power factor sensing overspeeding of the second motor and limiting the firing angle of the the thyristor switch to a minimum value so as to convert the second motor, during such overspeeding, into a generator whose output is fed back to the utility.

2. A system as claimed in claim 1 wherein said load comprises a compressor.

* * * * *